(12) United States Patent
Morimoto et al.

(10) Patent No.: US 10,267,153 B2
(45) Date of Patent: Apr. 23, 2019

(54) GAS TURBINE, GAS TURBINE CONTROL DEVICE, AND GAS TURBINE COOLING METHOD

(71) Applicant: MITSUBISHI HITACHI POWER SYSTEMS, LTD., Kanagawa (JP)

(72) Inventors: Kazuki Morimoto, Tokyo (JP); Katsunori Tanaka, Tokyo (JP)

(73) Assignee: Mitsubishi Hitachi Power Systems, Ltd., Kanagawa (JP)

( * ) Notice: Subject to any disclaimer, the term of this patent is extended or adjusted under 35 U.S.C. 154(b) by 312 days.

(21) Appl. No.: 15/108,048

(22) PCT Filed: Jan. 30, 2015

(86) PCT No.: PCT/JP2015/052770
§ 371 (c)(1),
(2) Date: Jun. 24, 2016

(87) PCT Pub. No.: WO2015/115625
PCT Pub. Date: Aug. 6, 2015

(65) Prior Publication Data
US 2016/0326878 A1 Nov. 10, 2016

(30) Foreign Application Priority Data

Feb. 3, 2014 (JP) .................................. 2014-018877

(51) Int. Cl.
*F02C 9/18* (2006.01)
*F01D 5/08* (2006.01)
(Continued)

(52) U.S. Cl.
CPC ............. *F01D 5/081* (2013.01); *F01D 9/065* (2013.01); *F01D 11/24* (2013.01); *F02C 6/08* (2013.01);
(Continued)

(58) Field of Classification Search
CPC ...... F02C 9/18; F02C 9/48; F02C 7/18; F02C 7/185; F02C 6/08; F05D 2270/303;
(Continued)

(56) References Cited

U.S. PATENT DOCUMENTS

| 4,051,669 A | * | 10/1977 | Yannone | ................... F02C 9/32 |
| | | | | 60/39.091 |
| 4,314,441 A | * | 2/1982 | Yannone | ................... F02C 9/28 |
| | | | | 60/39.281 |

(Continued)

FOREIGN PATENT DOCUMENTS

| JP | 3-59440 | 6/1991 |
| JP | 4-292530 | 10/1992 |

(Continued)

OTHER PUBLICATIONS

International Search Report dated Apr. 28, 2015 in International (PCT) Application No. PCT/JP2015/052770.

(Continued)

*Primary Examiner* — William H Rodriguez
(74) *Attorney, Agent, or Firm* — Wenderoth, Lind & Ponack, L.L.P.

(57) ABSTRACT

A gas turbine includes a cooling air supply passage which supplies compressed air bled from a compressor to a disk cavity of a turbine, a cooler side valve in the cooling air supply passage, a temperature measurement unit which measures ambient temperature of the disk cavity, and a control device which adjusts an opening degree of the cooler side valve based on the ambient temperature measured by the temperature measurement unit. The control device includes a first valve opening degree setting value and a second valve opening degree setting value larger than the first valve opening degree setting value of the cooler side valve, the first valve opening degree setting value is used when the ambient temperature is lower than a predetermined (Continued)

switching temperature, and the second valve opening degree setting value is used when the ambient temperature is higher than the switching temperature.

11 Claims, 4 Drawing Sheets

(51) Int. Cl.
    *F02C 6/08*     (2006.01)
    *F02C 7/18*     (2006.01)
    *F01D 9/06*     (2006.01)
    *F01D 11/24*     (2006.01)

(52) U.S. Cl.
    CPC ................. *F02C 7/18* (2013.01); *F02C 9/18* (2013.01); *F05D 2220/32* (2013.01); *F05D 2270/303* (2013.01); *F05D 2270/80* (2013.01)

(58) Field of Classification Search
    CPC ...... F05D 2270/80; F01D 5/081; F01D 11/24; F01D 9/065
    See application file for complete search history.

(56) References Cited

U.S. PATENT DOCUMENTS

| | | | | |
|---|---|---|---|---|
| 4,967,552 A * | 11/1990 | Kumata | ............. | F01D 5/08 415/115 |
| 5,636,659 A | 6/1997 | Smed | | |
| 5,993,149 A | 11/1999 | Smed | | |
| 7,823,388 B2 | 11/2010 | Murakami | | |
| 8,881,532 B2 * | 11/2014 | Bozzi | ............. | F02C 7/18 60/782 |
| 9,249,729 B2 * | 2/2016 | Bacic | ............. | F02C 6/08 |
| 9,255,492 B2 * | 2/2016 | Bacic | ............. | F01D 11/24 |
| 2009/0324389 A1 * | 12/2009 | Fischetti | ............. | F01D 5/08 415/118 |
| 2010/0290889 A1 * | 11/2010 | Fedor | ............. | F01D 11/04 415/47 |
| 2011/0072827 A1 * | 3/2011 | Ciofini | ............. | F01D 5/082 60/772 |
| 2012/0180493 A1 * | 7/2012 | Snook | ............. | F01D 5/081 60/772 |
| 2013/0111919 A1 * | 5/2013 | Chehab | ............. | F01D 11/24 60/778 |
| 2014/0165583 A1 * | 6/2014 | Oliverio | ............. | F02C 9/18 60/776 |
| 2014/0255145 A1 * | 9/2014 | Miranda | ............. | F01D 5/082 415/1 |
| 2015/0037140 A1 * | 2/2015 | Biyani | ............. | F01D 5/082 415/116 |
| 2017/0114725 A1 * | 4/2017 | Holt | ............. | F01D 11/24 |
| 2018/0010520 A1 * | 1/2018 | Iwasaki | ............. | F02C 7/185 |

FOREIGN PATENT DOCUMENTS

| | | |
|---|---|---|
| JP | 5-171958 | 7/1993 |
| JP | 11-513772 | 11/1999 |
| JP | 2006-283714 | 10/2006 |
| JP | 2012-102648 | 5/2012 |
| JP | 2013-36357 | 2/2013 |
| JP | 2013-57278 | 3/2013 |

OTHER PUBLICATIONS

Written Opinion of the International Search Authority dated Apr. 28, 2015 in International (PCT) Application No. PCT/JP2015/052770, with English translation.
Notification of Reasons for Refusal dated Jul. 11, 2017 in corresponding Japanese Application No. 2014-018877, with English translation.

* cited by examiner

GAS TURBINE, GAS TURBINE CONTROL DEVICE, AND GAS TURBINE COOLING METHOD

FIELD

The present invention relates to a gas turbine capable of obtaining rotational power, for example, by supplying a fuel to compressed high-temperature/high-pressure air, burning the fuel, and supplying a generated combustion gas to a turbine, and further relates to a gas turbine control device and a gas turbine cooling method.

BACKGROUND

A general gas turbine includes a compressor, a combustor, and a turbine. The compressor obtains high-temperature/high-pressure compressed air by compressing air received from an air inlet. The combustor obtains a high-temperature/high-pressure combustion gas by supplying a fuel to the compressed air and burning the fuel. The turbine is driven by the combustion gas so that a generator coaxially connected thereto is driven.

The turbine of the gas turbine has a configuration in which a plurality of vanes and a plurality of blades are alternately disposed inside a casing in the combustion gas flow direction. When a combustion gas generated by the combustor passes through the plurality of vanes and the plurality of blades, a rotor is rotationally driven and the generator connected to the rotor is driven.

Incidentally, a part of the compressed air obtained in the compressor of the gas turbine is bled and is used to cool the vanes of the turbine. Further, a part of the compressed air is guided to the outside, is cooled by an air cooler, and is used to cool the turbine disks and the blades. Furthermore, a part of the air having been used to cool the vanes of the turbine flows outward from a blade surface or a blade trailing edge, while another part of the air flows into a disk cavity provided with a labyrinth seal between the turbine disks at the front and rear stages so as to cool the seal portion and the blade roots.

An example of the gas turbine is disclosed in, for example, Patent Literature 1.

CITATION LIST

Patent Literatures

Patent Literature 1: Japanese Patent Application Laid-open No. 4-292530
Patent Literature 2: Japanese Patent Application Laid-open No. 5-171958

SUMMARY

Technical Problem

The above-described gas turbine of the related art includes a flow rate control valve which is provided in an external cooling air pipe, a temperature detector which measures an air temperature inside the disk cavity, and a valve adjustment unit which adjusts the opening degree of the flow rate control valve based on a detection signal from the temperature detector. Thus, since the opening degree of the flow rate control valve is adjusted based on the air temperature inside the disk cavity, the amount of the cooling air in the gas turbine can be accurately maintained at a necessary minimum amount. Incidentally, in such control, the air temperature inside the disk cavity is not easily maintained at an appropriate temperature during a transition period in which an output (a load) increases in the activation of the gas turbine. That is, when the opening degree of the flow rate control valve is controlled according to PI-control based on the air temperature inside the disk cavity, the air temperature changes (increases and decreases) whenever the opening degree changes. For this reason, the flow rate control valve is opened and closed in a short time and hence the control becomes complex.

The present invention is made to solve the above-described problems and an object thereof is to provide a gas turbine, a gas turbine control device, and a gas turbine cooling method capable of appropriately controlling an air temperature of a disk cavity and simplifying control.

Solution to Problem

According to an aspect of the present invention, a gas turbine comprises: a compressor which compresses air; a combustor which burns a mixture of a fuel and the air compressed by the compressor; a turbine which obtains rotational power by a combustion gas generated by the combustor; a cooling air supply passage which supplies air bled from the compressor to a disk cavity of the turbine; an opening/closing valve which is provided in the cooling air supply passage; a temperature measurement unit which measures an ambient temperature of the disk cavity; and a control device which adjusts an opening degree of the opening/closing valve based on the ambient temperature measured by the temperature measurement unit. The control device includes a first valve opening degree setting value and a second valve opening degree setting value larger than the first valve opening degree setting value of the opening/closing valve, and the first valve opening degree setting value is used when the ambient temperature is lower than a predetermined switching temperature and the second valve opening degree setting value is used when the ambient temperature is higher than the switching temperature.

Thus, the control device uses the first valve opening degree setting value when the ambient temperature of the disk cavity is lower than the switching temperature and uses the second valve opening degree setting value when the ambient temperature of the disk cavity is higher than the switching temperature. That is, since two kinds of the valve opening degree setting values are alternately used, the air temperature of the disk cavity can be appropriately controlled and the control can be simplified without opening and closing the opening/closing valve in a short time.

Advantageously, in the gas turbine of the present invention, the control device sets a speed at which the first valve opening degree setting value is switched to the second valve opening degree setting value to be faster than a speed at which the second valve opening degree setting value is switched to the first valve opening degree setting value.

Thus, the opening/closing valve is operated fast when the opening degree of the opening/closing valve is to be increased and the opening/closing valve is operated slowly when the opening degree of the opening/closing valve is to be reduced. For that reason, when the ambient temperature of the disk cavity increases, the temperature can be promptly decreased and hence the gas turbine can be continuously operated without any damage on the gas turbine. Further, when the ambient temperature of the disk cavity decreases, the temperature is increased slowly and hence the hunting of the opening/closing valve can be suppressed.

Advantageously, in the gas turbine of the present invention, the control device switches the second valve opening degree setting value to the first valve opening degree setting value when a load reaches a predetermined load after the gas turbine is activated.

Thus, since the control of the ambient temperature of the disk cavity is started after the load of the gas turbine reaches a predetermined load, the ambient temperature of the disk cavity can be adjusted with high precision.

Advantageously, in the gas turbine of the present invention, the control device switches the second valve opening degree setting value to the first valve opening degree setting value after a predetermined time elapses from a time point at which the load reaches the predetermined load.

Thus, since the control of the ambient temperature of the disk cavity is started after a predetermined time elapses from the time point at which the load of the gas turbine reaches the predetermined load, an abrupt increase in the ambient temperature of the disk cavity can be suppressed.

Advantageously, in the gas turbine of the present invention, the predetermined load is at least 90% or more of a full load.

Thus, since the control of the ambient temperature of the disk cavity is started before the load of the gas turbine reaches the full load, the ambient temperature of the disk cavity can be safely adjusted with high precision.

Advantageously, in the gas turbine of the present invention, the switching temperature includes a first switching temperature and a second switching temperature higher than the first switching temperature, the second valve opening degree setting value is used when the ambient temperature is higher than the second switching temperature, and the first valve opening degree setting value is used when the ambient temperature is lower than the first switching temperature.

Thus, since the valve opening degree switching temperature is set to be different in accordance with an increase and decrease in the ambient temperature of the disk cavity, the temperature can be stably managed without opening and closing the opening/closing valve in a short time.

According to another aspect of the present invention, in a control device of a gas turbine including: a compressor which compresses air; a combustor which burns a mixture of a fuel and compressed air compressed by the compressor; a turbine which obtains rotational power by a combustion gas generated by the combustor; a cooling air supply passage which supplies the compressed air bled from the compressor to a disk cavity of the turbine; an opening/closing valve which is provided in the cooling air supply passage; and a temperature measurement unit which measures an ambient temperature of the disk cavity, an opening degree of the opening/closing valve is able to be adjusted based on the ambient temperature measured by the temperature measurement unit, a first valve opening degree setting value and a second valve opening degree setting value larger than the first valve opening degree setting value of the opening/closing valve are able to be set, and the first valve opening degree setting value is used when the ambient temperature is lower than a predetermined switching temperature and the second valve opening degree setting value is used when the ambient temperature is higher than the switching temperature.

Thus, since two kinds of the valve opening degree setting values are alternately used, the air temperature of the disk cavity can be appropriately controlled and the control can be simplified without opening and closing the opening/closing valve in a short time.

According to still another aspect of the present invention, a gas turbine cooling method of cooling a gas turbine including a compressor which compresses air, a combustor which burns a mixture of a fuel and the air compressed by the compressor, a turbine which obtains rotational power by a combustion gas generated by the combustor, a cooling air supply passage which supplies the compressed air bled from the compressor to a disk cavity of the turbine, and an opening/closing valve which is provided in the cooling air supply passage, the gas turbine cooling method being used to adjust an opening degree of the opening/closing valve in response to an ambient temperature of the disk cavity, comprises the steps of: measuring the ambient temperature of the disk cavity; applying a predetermined first valve opening degree setting value as the opening degree of the opening/closing valve when the ambient temperature is lower than a predetermined switching temperature; and applying a second valve opening degree setting value larger than the first valve opening degree setting value as the opening degree of the opening/closing valve when the ambient temperature is higher than the switching temperature.

Thus, since two kinds of the valve opening degree setting values are alternately used, the air temperature of the disk cavity can be appropriately controlled and the control can be simplified without opening and closing the opening/closing valve in a short time.

Advantageous Effects of Invention

According to the gas turbine, the gas turbine control device, and the gas turbine cooling method of the invention, the first valve opening degree setting value and the second valve opening degree setting value larger than the first valve opening degree setting value of the opening/closing valve are set, the first valve opening degree setting value is used when the ambient temperature of the cavity is lower than the predetermined switching temperature, and the second valve opening degree setting value is used when the ambient temperature is higher than the switching temperature. Thus, since two kinds of the valve opening degree setting values are alternately used, the air temperature of the disk cavity can be appropriately controlled and the control can be simplified without opening and closing the opening/closing valve in a short time.

DESCRIPTION OF EMBODIMENTS

Hereinafter, a gas turbine, a gas turbine control device, and a gas turbine cooling method according to a preferred embodiment of the invention will be described with reference to the drawings. Further, the invention is not limited to the embodiment. In the case of a plurality of embodiments, a combination thereof may be employed.

Figure 1:
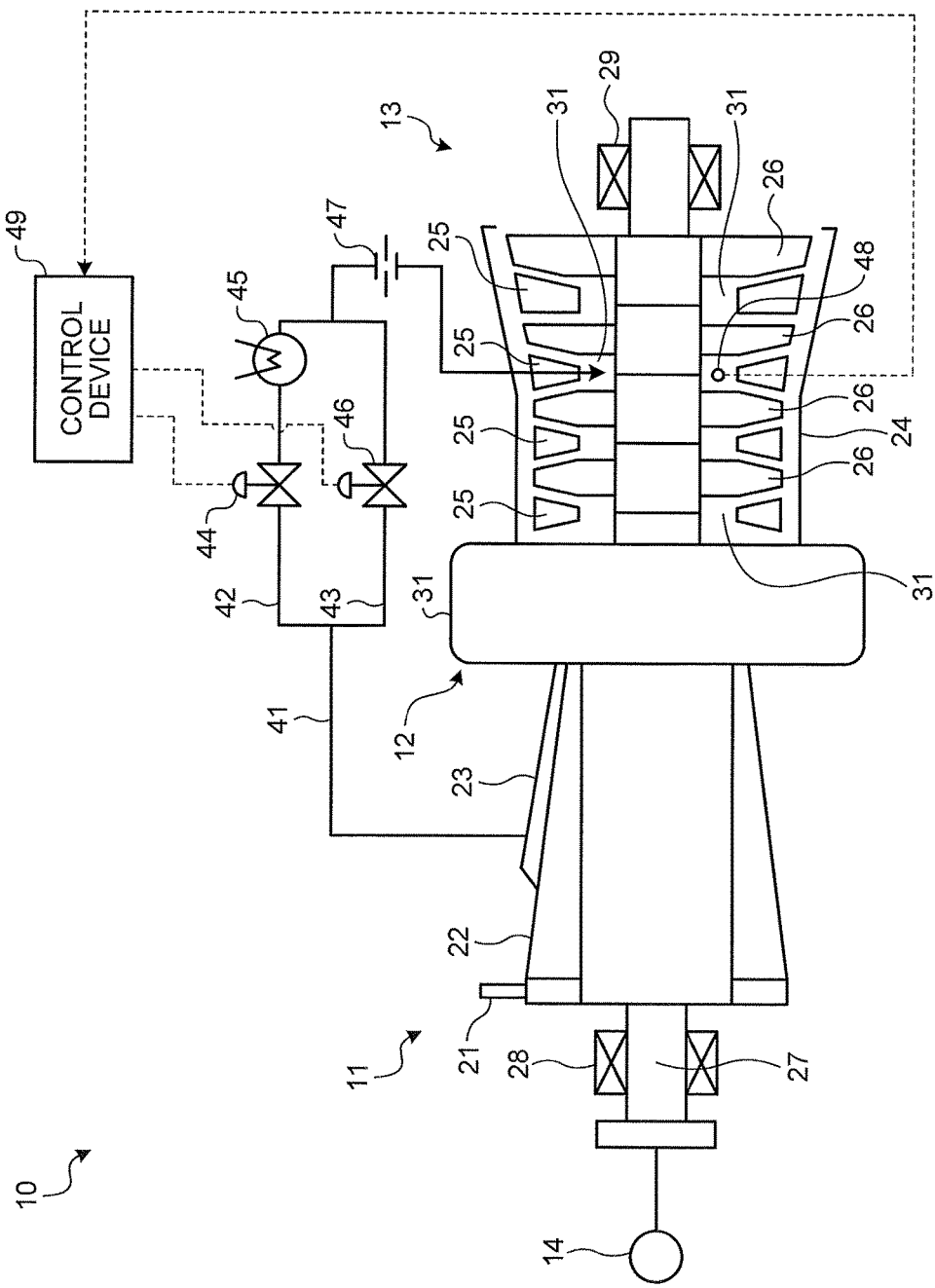
FIG. 1 is a schematic configuration diagram illustrating a gas turbine of an embodiment.

FIG. 1 is a schematic configuration diagram illustrating the gas turbine of the embodiment.

In the embodiment, as illustrated in FIG. 1, a gas turbine 10 includes a compressor 11, a combustor 12, and a turbine 13. Here, the gas turbine 10 is coaxially connected to a generator 14. When the generator 14 is used as a motor, the gas turbine 10 can be activated. Then, when the generator 14 is driven by the power after the activation of the gas turbine 10, electric power can be generated.

The compressor 11 includes an air inlet 21 which receives air. An inlet guide vane (IGV) (not illustrated), and a plurality of vanes and a plurality of blades alternately disposed in the air flow direction (the axial direction of a rotor to be described later) are disposed at the inside of a compressor casing 22, and an air bleeding chamber 23 is provided at the outside thereof. The compressor 11 is able to generate high-temperature/high-pressure compressed air by compressing air received from the air inlet 21.

The combustor 12 generates a combustion gas by supplying a fuel to the high-temperature/high-pressure compressed air compressed by the compressor 11 and burning the fuel. The turbine 13 has a configuration in which a plurality of vanes 25 and a plurality of blades 26 are alternately disposed in the combustion gas flow direction (the axial direction of a rotor to be described later) at the inside of a turbine casing 24. Then, although not illustrated in the drawings, the turbine casing 24 has a configuration in which an exhaust chamber is disposed at the downstream side through an exhaust casing. The turbine 13 is driven by the combustion gas discharged from the combustor 12 so that the generator 14 coaxially connected to the turbine is driven.

A rotor shaft 27 is disposed so as to penetrate the center portions of the compressor 11, the combustor 12, and the turbine 13. The rotor shaft 27 has a configuration in which an end near the compressor 11 is rotatably supported by a bearing portion 28 and an end near the turbine 13 is rotatably supported by a bearing portion 29. Then, to the rotor shaft 27, a stack of a plurality of disks with the blades attached thereto is fixed in the compressor 11, and a stack of a plurality of disks with the blades 26 attached thereto is fixed in the turbine 13.

Thus, in the compressor 11, air received from the air inlet 21 is compressed while passing through the inlet guide vane, the plurality of vanes, and the plurality of blades so as to become high-temperature/high-pressure compressed air. In the combustor 12, a predetermined fuel is supplied to the compressed air so as to be burned. In the turbine 13, the high-temperature/high-pressure combustion gas generated in the combustor 12 passes through the plurality of vanes 25 and the plurality of blades 26 of the turbine 13 so that the rotor shaft 27 is rotationally driven and the generator 14 connected to the rotor shaft 27 is driven.

In the turbine 13 with such a configuration, the plurality of vanes 25 is fixed to the inner wall portion of the turbine casing 24 at the same intervals in the circumferential direction. Further, the plurality of blades 26 is fixed to the outer peripheral portion of the rotor shaft 27 at the same intervals in the circumferential direction. The vanes 25 and the blades 26 are alternately disposed in the combustion gas passage in the axial direction of the rotor shaft 27. Then, a gap, that is, a disk cavity 31 is formed between the leading end portion of each vane 25 and the outer peripheral portion of the rotor shaft 27, and a seal member is provided from the outer peripheral portion of the rotor shaft 27 toward the leading end portion of the vane 25. Then, when cooling air supplied into the vane 25 is discharged from the leading end portion of the vane 25 toward the upstream side of the combustion gas passage, a sealing property is ensured by the seal member.

Incidentally, when the gas turbine 10 is activated, the combustion gas flows into the combustion gas passage and the vanes 25 and the blades 26 are heated and extended thermally. However, since the turbine casing 24 including the vanes 25 is first heated and extended thermally, a gap between the leading end portion of each vane 25 and the outer peripheral portion of the rotor shaft 27 increases. For that reason, there is a tendency that the sealing property of the disk cavity 31 is degraded and the ambient temperature of the disk cavity increases.

The embodiment is contrived to prevent this problem. In the embodiment, the amount of the cooling air supplied to the disk cavity 31 is adjusted to thereby appropriately maintain the ambient temperature of the disk cavity 31.

That is, a cooling air supply passage 41 is provided so as to supply the compressed air bled from the air bleeding chamber 23 of the compressor 11 as the cooling air to the disk cavity 31 of the turbine 13. The cooling air supply passage 41 includes a main passage 42 and a branch passage 43 disposed in parallel, the main passage 42 is provided with a cooler side valve 44 and a cooler 45, and the branch passage 43 is provided with a bypass valve 46. Further, an orifice 47 is provided at the downstream side of the main passage 42 and the branch passage 43 of the cooling air supply passage 41.

Further, only one cooling air supply passage 41 which supplies the compressed air bled from the air bleeding chamber 23 of the compressor 11 as the cooling air to the disk cavity 31 of the turbine 13 is depicted in FIG. 1. However, a plurality of the cooling air supply passages 41 is provided so as to supply the compressed air bled from the air bleeding chamber 23 of each stage of the compressor 11 as the cooling air to the disk cavity 31 of each stage of the turbine 13.

The turbine 13 includes a temperature measurement unit 48 which measures the ambient temperature (DCT) of the disk cavity 31. A control device 49 is able to adjust the opening degree of the cooler side valve 44 based on the ambient temperature of the disk cavity 31 measured by the temperature measurement unit 48. That is, when the ambient temperature of the disk cavity 31 measured by the temperature measurement unit 48 increases, the control device 49 adjusts the opening degree of the cooler side valve 44 so that the opening degree increases. Thus, the flow rate of the cooling air is increased so as to decrease the temperature and to decrease the ambient temperature of the disk cavity 31.

Further, the control device 49 includes a first valve opening degree setting value and a second valve opening degree setting value as the valve opening degree setting values of the cooler side valve 44. In this case, the second valve opening degree setting value is larger than the first valve opening degree setting value. Then, the control device 49 uses the first valve opening degree setting value when the ambient temperature of the disk cavity 31 is lower than a predetermined switching temperature and uses the second valve opening degree setting value when the ambient temperature of the disk cavity 31 is higher than the switching temperature.

Figure 2:
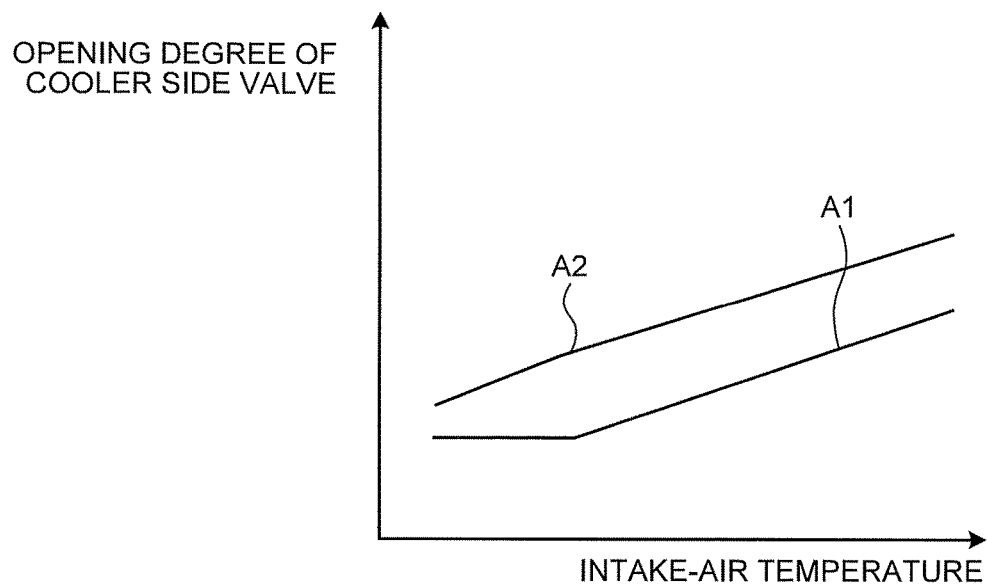
FIG. 2 is a graph illustrating an opening degree of an opening/closing valve with respect to an intake-air temperature of a gas turbine.
Figure 3:
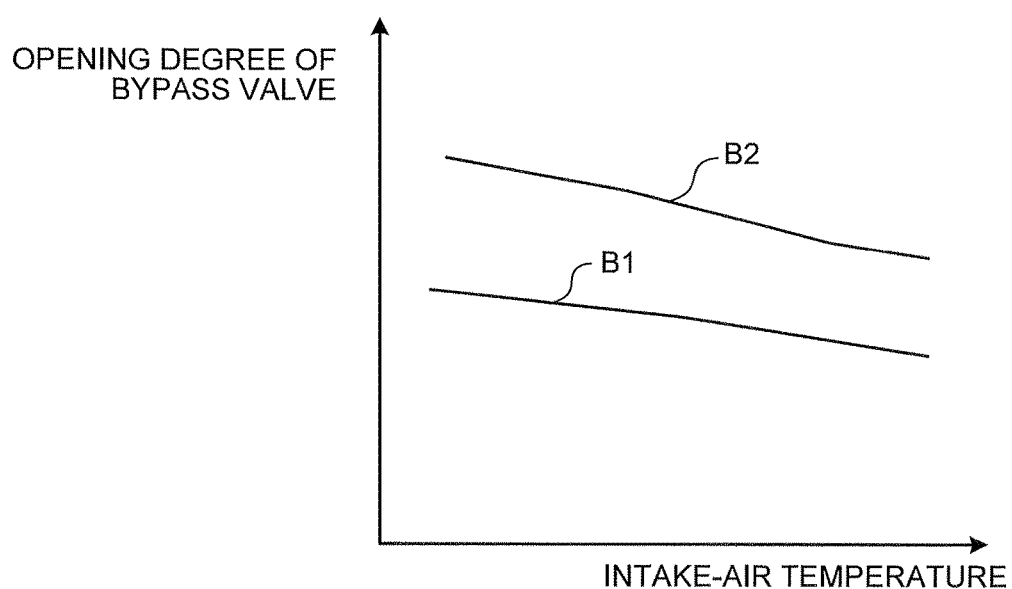
FIG. 3 is a graph illustrating an opening degree of a bypass valve with respect to the intake-air temperature of the gas turbine.

FIG. 2 is a graph illustrating the opening degree of the opening/closing valve with respect to the intake-air temperature of the gas turbine and FIG. 3 is a graph illustrating the opening degree of the bypass valve with respect to the intake-air temperature of the gas turbine.

Here, as illustrated in FIG. 2, a map is depicted in which the valve opening degree setting value of the cooler side valve 44 is set as the opening degree of the cooler side valve 44 with respect to the intake-air temperature of the gas turbine. Here, the valve opening degree setting value is set as a first valve opening degree setting value A1 and a second valve opening degree setting value A2 according to the ambient temperature (DCT) of the disk cavity 31. In the first valve opening degree setting value A1, the opening degree of the cooler side valve 44 increases from a constant state with respect to an increase in the intake-air temperature of the gas turbine. In the second valve opening degree setting value A2, the opening degree of the cooler side valve 44 proportionally increases with respect to an increase in the intake-air temperature of the gas turbine. In this map, the opening degree of the cooler side valve 44 is set to be large in the second valve opening degree setting value A2 compared with the first valve opening degree setting value A1.

Additionally, it has been described that the control device 49 includes the first valve opening degree setting value and the second valve opening degree setting value as the valve opening degree setting values of the cooler side valve 44, but the invention is not limited thereto. For example, as illustrated in FIG. 3, the control device 49 may include a first valve opening degree setting value B1 and a second valve opening degree setting value B2 as the valve opening degree setting values of the bypass valve 46. Further, the control device 49 may include the first valve opening degree setting values A1 and B1 and the second valve opening degree setting values A2 and B2 as the valve opening degree setting values of the cooler side valve 44 and the bypass valve 46.

Further, it has been described that the main passage 42 and the branch passage 43 in parallel are provided to the cooling air supply passage 41, the main passage 42 is provided with the cooler side valve 44 and the cooler 45, and the branch passage 43 is provided with the bypass valve 46, but the invention is not limited thereto. For example, the bypass valve 46 may be omitted from the branch passage 43.

Further, the control device 49 sets a speed (a second change rate of an opening/closing speed) at which the first valve opening degree setting value A1 is switched to the second valve opening degree setting value A2 to be faster (higher) than a speed (a first change rate of an opening/closing speed) at which the second valve opening degree setting value A2 is switched to the first valve opening degree setting value A1. That is, when the first valve opening degree setting value A1 is switched to the second valve opening degree setting value A2, the opening/closing valve 45 is closed slowly. Meanwhile, when the second valve opening degree setting value A2 is switched to the first valve opening degree setting value A1, the opening/closing valve is opened fast.

Further, when a load reaches a predetermined load (for example, a load of at least 90% or more of the full load of the gas turbine 10) after the activation of the gas turbine 10, the control device 49 switches the second valve opening degree setting value A2 to the first valve opening degree setting value A1. Further, it is desirable that the control device 49 switch the second valve opening degree setting value A2 to the first valve opening degree setting value A1 after a predetermined time elapses from the time point at which the load reaches the predetermined load.

Then, the control device 49 includes a first switching temperature T1 and a second switching temperature T2 higher than the first switching temperature T1 as switching temperatures for switching the first valve opening degree setting value A1 and the second valve opening degree setting value A2. When the ambient temperature of the disk cavity 31 becomes higher than the second switching temperature T2, the second valve opening degree setting value A2 is used. Meanwhile, when the ambient temperature of the disk cavity 31 becomes lower than the first switching temperature T1, the first valve opening degree setting value A1 is used.

Here, a gas turbine cooling method will be described.

The gas turbine cooling method of the embodiment is used to adjust the opening degree of the cooler side valve 44 in response to the ambient temperature DCT of the disk cavity 31 and includes the steps of measuring the ambient temperature DCT of the disk cavity 31, applying the first valve opening degree setting value A1 to the cooler side valve 44 when the ambient temperature DCT is lower than the switching temperature, and applying the second valve opening degree setting value A2 larger than the first valve opening degree setting value A1 to the cooler side valve 44 when the ambient temperature DCT is higher than the switching temperature.

Figure 4:
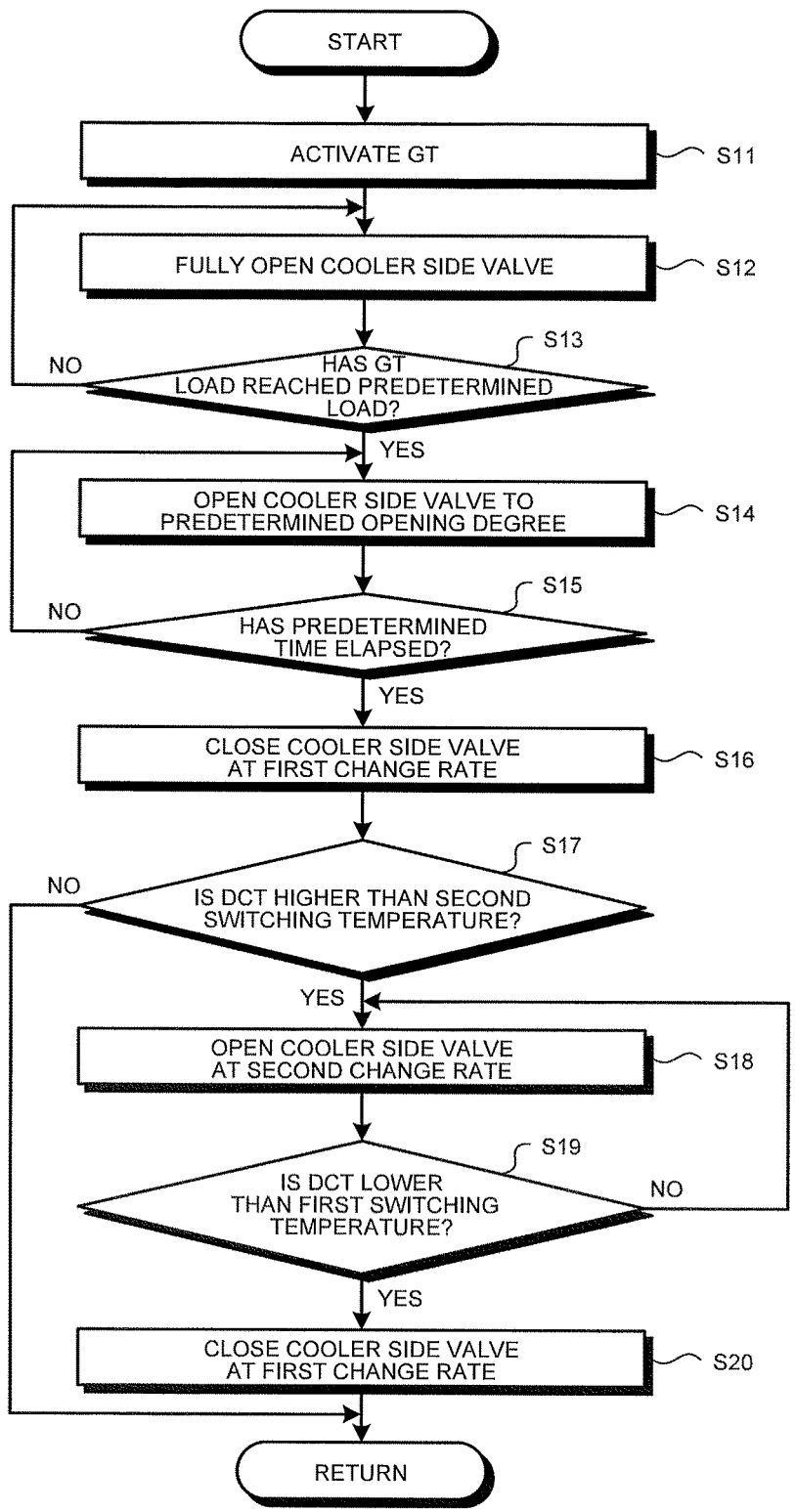
FIG. 4 is a flowchart illustrating gas turbine cooling control.
Figure 5:
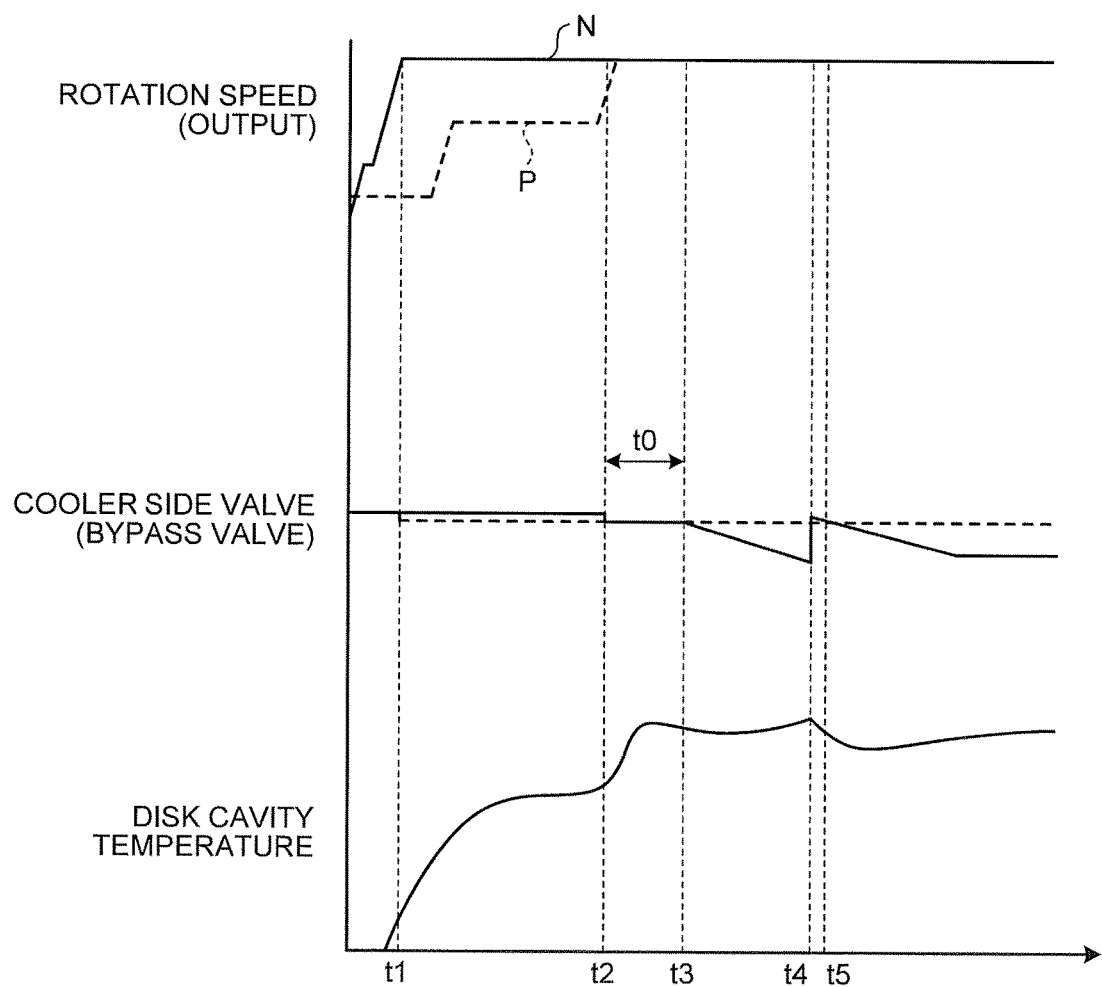
FIG. 5 is a time chart illustrating the gas turbine cooling control.

Hereinafter, the gas turbine cooling method will be described in detail. FIG. 4 is a flowchart illustrating the gas turbine cooling control and FIG. 5 is a time chart illustrating the gas turbine cooling control.

As illustrated in FIG. 4, in step S11, the gas turbine (GT) 10 is activated. Then, in step S12, the cooler side valve 44 is fully opened. Then, the load (output) of the gas turbine 10 increases in accordance with an increase in the rotation speed of the rotor shaft 27. In step S13, it is determined whether the load of the gas turbine (GT) has reached a predetermined load (for example, 95%). Here, when it is determined that the GT load has not reached the predetermined load (95%) (No), this state is maintained.

Meanwhile, when it is determined that the GT load has reached the predetermined load (95%) (Yes), in step S14, the cooler side valve 44 is opened to a predetermined opening degree (the second valve opening degree setting value A2) from the full opening degree. Then, in step S15, it is determined whether a predetermined time has elapsed after the GT load reached the predetermined load (95%). Here, when it is determined that the predetermined time has not elapsed after the GT load reached the predetermined load (95%) (No), this state is maintained.

Meanwhile, when it is determined that the predetermined time has elapsed after the GT load reached the predetermined load (95%) (Yes), in step S16, the cooler side valve 44 is closed at the speed of the first change rate and the second valve opening degree setting value A2 is switched to the first valve opening degree setting value A1. In step S17, it is determined whether the ambient temperature DCT of the disk cavity 31 is higher than the second switching temperature T2. That is, when the cooler side valve 44 is closed, the amount of the compressed air supplied to the disk cavity 31 increases and the ambient temperature DCT increases. Thus, this state is monitored.

Here, when it is determined that the ambient temperature DCT of the disk cavity 31 is higher than the second switching temperature T2 (Yes), in step S18, the cooler side valve 44 is opened at the speed of the second change rate and the first valve opening degree setting value A1 is switched to the second valve opening degree setting value A2. Then, when the cooler side valve 44 is opened, the amount of the compressed air supplied to the disk cavity 31 decreases and the ambient temperature DCT of the disk cavity 31 decreases. Thus, this state is monitored. Subsequently, in step S19, it is determined whether the ambient temperature DCT of the disk cavity 31 is lower than the first switching temperature T1. Here, when it is determined that the ambient temperature DCT of the disk cavity 31 is equal to or higher than the first switching temperature T1 (No), this state is maintained.

Meanwhile, when it is determined that the ambient temperature DCT of the disk cavity 31 is lower than the first switching temperature T1 (Yes), in step S20, the cooler side valve 44 is closed at the speed of the first change rate and the second valve opening degree setting value A2 is switched to the first valve opening degree setting value A1. Additionally, in step S17, when it is determined that the ambient temperature DCT of the disk cavity 31 is not higher than the second switching temperature T2 (No), the routine ends without performing anything.

Further, as illustrated in FIG. 5, when the gas turbine 10 is activated, the rotation speed N of the rotor shaft 27 increases. Then, when the rotation speed reaches a rated rotation speed at the time t1, the load (output) P increases. Further, the ambient temperature DCT of the disk cavity 31 also increases.

Then, when the load of the gas turbine (GT) has reached the predetermined load (95%), the cooler side valve 44 is switched from the full opening degree to the second valve opening degree setting value A2 at the time t2. Then, at the time t3 when a predetermined time t0 has elapsed, the cooler side valve 44 is closed slowly at the speed of the first change rate and the second valve opening degree setting value A2 is switched to the first valve opening degree setting value A1. However, when the cooler side valve 44 is closed, the amount of the compressed air supplied to the disk cavity 31 decreases and hence the ambient temperature DCT of the disk cavity 31 increases. Then, when the ambient temperature DCT of the disk cavity 31 becomes higher than the second switching temperature T2 at the time t4, the cooler side valve 44 is opened fast at the speed of the second change rate and the first valve opening degree setting value A1 is switched to the second valve opening degree setting value A2.

Then, when the cooler side valve 44 is opened, the amount of the compressed air supplied to the disk cavity 31 increases and the ambient temperature DCT of the disk cavity 31 decreases. Then, when the ambient temperature DCT of the disk cavity 31 becomes lower than the first switching temperature T1 at the time t5, the cooler side valve 44 is closed at the speed of the first change rate and the second valve opening degree setting value A2 is switched to the first valve opening degree setting value A1.

Thus, the gas turbine of the embodiment includes the cooling air supply passage 41 which supplies the compressed air bled from the compressor 11 to the disk cavity 31 of the turbine 13, the cooler side valve 44 which is provided in the cooling air supply passage 41, the temperature measurement unit 48 which measures the ambient temperature of the disk cavity 31, and the control device 49 which adjusts the opening degree of the cooler side valve 44 based on the ambient temperature measured by the temperature measurement unit 48. The control device 49 includes the first valve opening degree setting value A1 and the second valve opening degree setting value A2 larger than the first valve opening degree setting value A1 of the cooler side valve 44. When the ambient temperature is lower than the predetermined switching temperature, the first valve opening degree setting value A1 is used. Meanwhile, when the ambient temperature is higher than the switching temperature, the second valve opening degree setting value A2 is used.

Thus, the control device 49 uses the first valve opening degree setting value A1 when the ambient temperature of the disk cavity 31 is lower than the switching temperature and uses the second valve opening degree setting value A2 when the ambient temperature of the disk cavity 31 is higher than the switching temperature. That is, since two kinds of the valve opening degree setting values A1 and A2 are alternately used, the air temperature of the disk cavity 31 can be appropriately controlled and the control can be simplified without repeatedly opening and closing the cooler side valve 44 in a short time.

In the gas turbine of the embodiment, the control device 49 sets a speed at which the first valve opening degree setting value A1 is switched to the second valve opening degree setting value A2 to be faster than a speed at which the second valve opening degree setting value A2 is switched to the first valve opening degree setting value A1. Thus, when the opening degree of the cooler side valve 44 is to be increased, the cooler side valve 44 is operated fast. Meanwhile, when the opening degree of the cooler side valve 44 is to be reduced, the cooler side valve 44 is operated slowly. For that reason, when the ambient temperature of the disk cavity 31 increases, the temperature can be decreased promptly and hence the gas turbine can be continuously operated without any damage. Further, when the ambient temperature of the disk cavity 31 decreases, the temperature increases slowly and hence the hunting of the cooler side valve 44 can be suppressed.

In the gas turbine of the embodiment, the control device 49 switches the second valve opening degree setting value A2 to the first valve opening degree setting value A1 when the load reaches a predetermined load after the activation of the gas turbine 10. Thus, when the control of the ambient temperature of the disk cavity 31 is started after the load of the gas turbine 10 reaches a predetermined load, the ambient temperature of the disk cavity 31 can be adjusted with high precision.

In the gas turbine of the embodiment, the control device 49 switches the second valve opening degree setting value A2 to the first valve opening degree setting value A1 after a predetermined time elapses from the time point at which the load reaches the predetermined load. Thus, since the control of the ambient temperature of the disk cavity 31 is started after a predetermined time elapses from the time point at which the load of the gas turbine 10 reaches the predetermined load, an abrupt increase in the ambient temperature of the disk cavity 31 can be suppressed.

In the gas turbine of the embodiment, the predetermined load is set to at least 90% or more of the full load. Thus, since the control of the ambient temperature of the disk cavity 31 is started before the load reaches the full load of the gas turbine 10, the ambient temperature of the disk cavity 31 can be adjusted safely with high precision.

In the gas turbine of the embodiment, the switching temperature includes the first switching temperature T1 and the second switching temperature T2 higher than the first switching temperature T1. Here, when the ambient temperature becomes higher than the second switching temperature T2, the second valve opening degree setting value A2 is used. Meanwhile, when the ambient temperature becomes lower than the first switching temperature T1, the first valve opening degree setting value A1 is used. Thus, since the valve opening degree switching temperatures T1 and T2 are set to be different in accordance with an increase and decrease in the ambient temperature of the disk cavity 31, the temperature can be stably managed without opening and closing the cooler side valve 44 in a short time.

Further, in the gas turbine control device of the embodiment, the opening degree of the cooler side valve 44 can be adjusted based on the ambient temperature measured by the temperature measurement unit 48, the first valve opening degree setting value A1 and the second valve opening degree setting value A2 larger than the first valve opening degree setting value A1 of the cooler side valve 44 can be set, the first valve opening degree setting value A1 is used when the ambient temperature is lower than the predetermined switching temperature, and the second valve opening degree setting value A2 is used when the ambient temperature is higher than the switching temperature. Thus, since two kinds of the valve opening degree setting values A1 and A2 are alternately used, the air temperature of the disk cavity 31 can be appropriately controlled and the control can be simplified without opening and closing the cooler side valve 44 in a short time.

Further, the gas turbine cooling method of the embodiment includes the steps of measuring the ambient temperature of the disk cavity 31, applying the predetermined first valve opening degree setting value A1 to the cooler side valve 44 when the ambient temperature is lower than the predetermined switching temperature, and applying the second valve opening degree setting value A2 larger than the first valve opening degree setting value A1 to the cooler side valve 44 when the ambient temperature is higher than the switching temperature. Thus, since two kinds of the valve opening degree setting values A1 and A2 are alternately used, the air temperature of the disk cavity 31 can be appropriately controlled and the control can be simplified without opening and closing the cooler side valve 44 in a short time.

REFERENCE SIGNS LIST

10 Gas Turbine
11 Compressor
12 Combustor
13 Turbine
23 Air Bleeding Chamber
24 Turbine Casing
25 Vane
26 Blade
27 Rotor Shaft
31 Disk Cavity
41 Cooling Air Supply Passage
42 Main Passage
43 Branch Passage
44 Cooler Side Valve (Opening/Closing Valve)
45 Cooler
46 Bypass Valve
48 Temperature Measurement Unit
49 Control Device

The invention claimed is:
1. A gas turbine comprising:
a compressor which compresses air;
a combustor which burns a mixture of a fuel and the air compressed by the compressor;
a turbine which obtains rotational power by a combustion gas generated by the combustor;
a cooling air supply passage which supplies air bled from the compressor to a disk cavity of the turbine;
an opening/closing valve which is provided in the cooling air supply passage;
a temperature measurement unit which measures an ambient temperature of the disk cavity; and
a control device which adjusts an opening degree of the opening/closing valve based on the ambient temperature measured by the temperature measurement unit, wherein
the control device includes a first valve opening degree setting value and a second valve opening degree setting value larger than the first valve opening degree setting value of the opening/closing valve,
the second valve opening degree setting value is used when the ambient temperature is higher than a second switching temperature and the first valve opening degree setting value is used when the ambient temperature is lower than a first switching temperature which is lower than the second switching temperature, and
the control device sets a speed at which the first valve opening degree setting value is switched to the second valve opening degree setting value to be faster than a speed at which the second valve opening degree setting value is switched to the first valve opening degree setting value.

2. The gas turbine according to claim 1,
wherein the control device switches the second valve opening degree setting value to the first valve opening degree setting value when a load reaches a predetermined load after the gas turbine is activated.

3. The gas turbine according to claim 2,
wherein the control device switches the second valve opening degree setting value to the first valve opening degree setting value after a predetermined time elapses from a time point at which the load reaches the predetermined load.

4. The gas turbine according to claim 3,
wherein the predetermined load is at least 90% or more of a full load.

5. The gas turbine according to claim 3,
wherein at least one of the first valve opening degree setting value and the second valve opening degree setting value increases in accordance with an increase in an intake-air temperature of the gas turbine.

6. The gas turbine according to claim 2,
wherein the predetermined load is at least 90% or more of a full load.

7. The gas turbine according to claim 6,
wherein at least one of the first valve opening degree setting value and the second valve opening degree setting value increases in accordance with an increase in an intake air-temperature of the gas turbine.

8. The gas turbine according to claim 2,
wherein at least one of the first valve opening degree setting value and the second valve opening degree setting value increases in accordance with an increase in an intake-air temperature of the gas turbine.

9. The gas turbine according to claim 1,
wherein at least one of the first valve opening degree setting value and the second valve opening degree setting value increases in accordance with an increase in an intake-air temperature of the gas turbine.

10. A control device of a gas turbine, the gas turbine comprising:
a compressor which compresses air;
a combustor which burns a mixture of a fuel and compressed air compressed by the compressor;
a turbine which obtains rotational power by a combustion gas generated by the combustor;
a cooling air supply passage which supplies the compressed air bled from the compressor to a disk cavity of the turbine;

an opening/closing valve which is provided in the cooling air supply passage; and a temperature measurement unit which measures an ambient temperature of the disk cavity, wherein the control device is configured to adjust an opening degree of the opening/closing valve based on the ambient temperature measured by the temperature measurement unit, set a first valve opening degree setting value and a second valve opening degree setting value larger than the first valve opening degree setting value of the opening/closing valve, set a first switching temperature and a second switching temperature higher than the first switching temperature, use the second valve opening degree setting value when the ambient temperature is higher than the second switching temperature and use the first valve opening degree setting value when the ambient temperature is lower than the first switching temperature, and set a speed at which the first valve opening degree setting value is switched to the second valve opening degree setting value to be faster than a speed at which the second valve opening degree setting value is switched to the first valve opening degree setting value.

11. A gas turbine cooling method of cooling a gas turbine including a compressor which compresses air, a combustor which burns a mixture of a fuel and the air compressed by the compressor, a turbine which obtains rotational power by a combustion gas generated by the combustor, a cooling air supply passage which supplies the compressed air bled from the compressor to a disk cavity of the turbine, an opening/closing valve which is provided in the cooling air supply passage, and a control device, the gas turbine cooling method being used by the control device to adjust an opening degree of the opening/closing valve in response to an ambient temperature of the disk cavity, and comprising the steps of:

measuring the ambient temperature of the disk cavity;

setting a first switching temperature and a second switching temperature higher than the first switching temperature, and using a second valve opening degree setting value when the ambient temperature is higher than the second switching temperature and using a first valve opening degree setting value which is smaller than the second valve opening degree setting value when the ambient temperature is lower than the first switching temperature, and setting a speed at which the first valve opening degree setting value is switched to the second valve opening degree setting value to be faster than a speed at which the second valve opening degree setting value is switched to the first valve opening degree setting value.

* * * * *